United States Patent
Shibasaki et al.

(10) Patent No.: US 11,594,982 B2
(45) Date of Patent: Feb. 28, 2023

(54) PARALLEL INVERTER DEVICE

(71) Applicant: DENRYO CO., LTD., Tokyo (JP)

(72) Inventors: Mamoru Shibasaki, Tokyo (JP); Hirotoshi Ezawa, Tokyo (JP); Naotsugu Ogura, Tokyo (JP); Shin-ichi Kobayashi, Tokyo (JP)

(73) Assignee: DENRYO CO., LTD., Tokyo (JP)

( * ) Notice: Subject to any disclaimer, the term of this patent is extended or adjusted under 35 U.S.C. 154(b) by 0 days.

(21) Appl. No.: 17/630,345

(22) PCT Filed: Sep. 13, 2019

(86) PCT No.: PCT/JP2019/036249
§ 371 (c)(1),
(2) Date: Jan. 26, 2022

(87) PCT Pub. No.: WO2021/049043
PCT Pub. Date: Mar. 18, 2021

(65) Prior Publication Data
US 2022/0294363 A1    Sep. 15, 2022

(51) Int. Cl.
*H02M 7/493* (2007.01)
*H02M 1/00* (2006.01)
H02M 7/5395 (2006.01)
H02M 7/5387 (2007.01)

(52) U.S. Cl.
CPC .......... *H02M 7/493* (2013.01); *H02M 1/0043* (2021.05); *H02M 7/5395* (2013.01); *H02M 7/53873* (2013.01)

(58) Field of Classification Search
CPC ............... H02M 7/493; H02M 7/5395; H02M 7/53873; H02M 1/0043
See application file for complete search history.

(56) References Cited

U.S. PATENT DOCUMENTS 11,159,096 B2 * 10/2021 Yuyama ............ H02M 7/53871
2018/0269771 A1 * 9/2018 Mori .................... H02M 1/0043

FOREIGN PATENT DOCUMENTS

JP      2005-102421 A      4/2005

OTHER PUBLICATIONS

International Search Report (ISR) dated Nov. 12, 2019 filed in PCT/JP2019/036249.

* cited by examiner

*Primary Examiner* — Jue Zhang
(74) *Attorney, Agent, or Firm* — Rankin, Hill & Clark LLP

(57) ABSTRACT

Provided is a parallel inverter device with which, among inverter devices each including a DC/AC inverter and the like, control of a parallel operation accompanied with an increase in power capacity or the like can be easily performed without using a control line for connecting between the inverter devices. A parallel inverter device (1) includes a switcher (15) in which, on an output line to which a load (40) is connected, two MOSFETs connected in series to the load are arranged so as to face each other so that their energization directions are opposite directions. ON/OFF of each MOSFET of the switcher (15) is controlled based on a polarity of an AC voltage output from a filter circuit (10) of the parallel inverter device (1) and a direction of a current flowing to the load (40) on the output line so that a cross current is interrupted. Further, a voltage difference or a phase difference between a load voltage and the AC voltage output from the filter circuit (10) is controlled so as to be reduced so that occurrence of the cross current is prevented.

14 Claims, 12 Drawing Sheets

FIG. 4
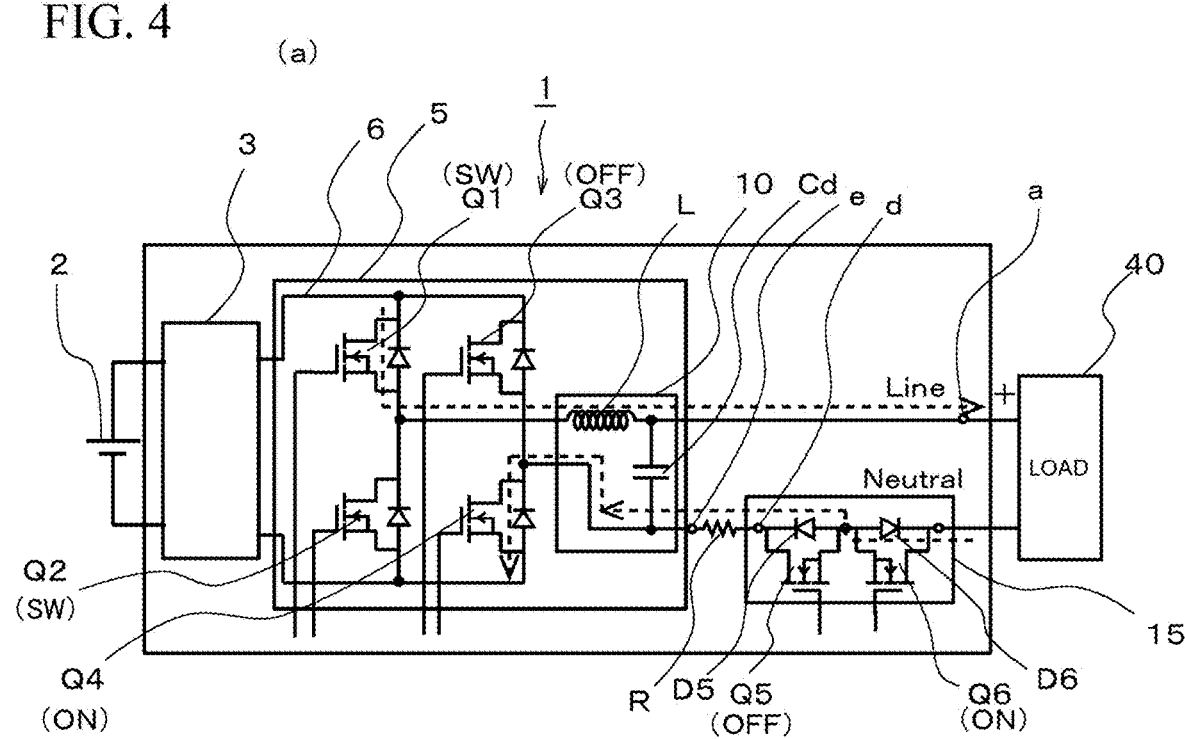
(a)
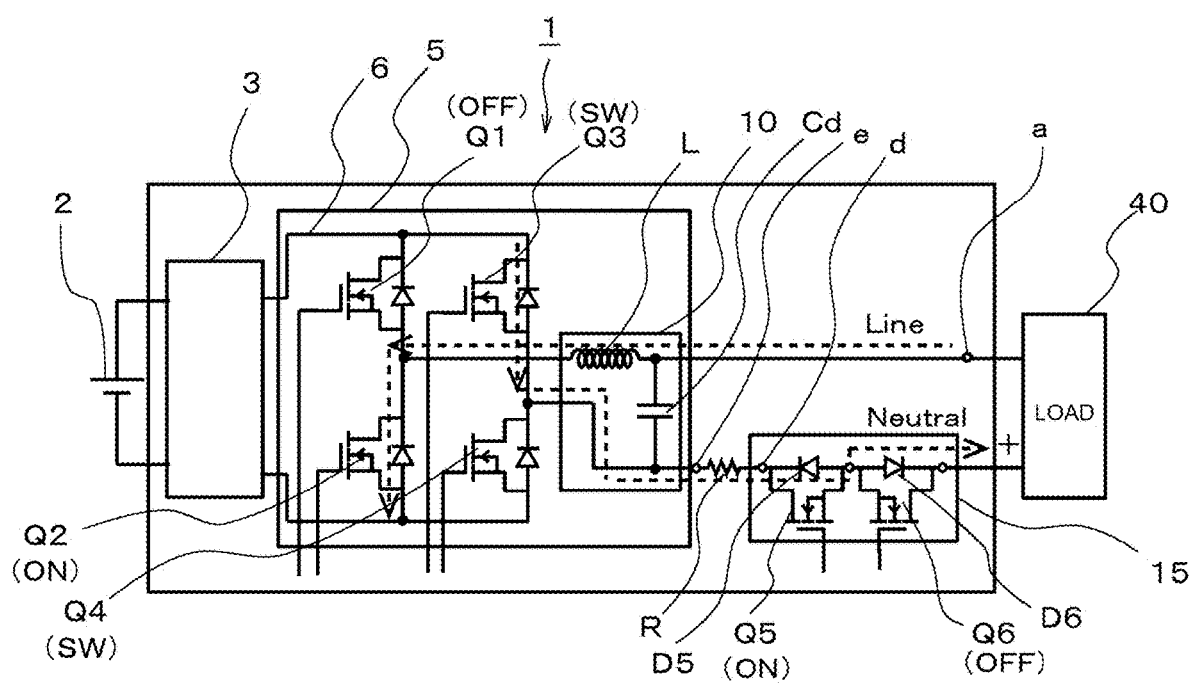
(b)

FIG. 5

| VOLTAGE | Line+ | Neutral+ |
|---|---|---|
| CURRENT | L → N | N → L |
| Q1 | SW | OFF |
| Q2 | SW | ON |
| Q3 | OFF | SW |
| Q4 | ON | SW |
| Q5 | OFF | ON |
| Q6 | ON | OFF |

FIG. 8
(a)
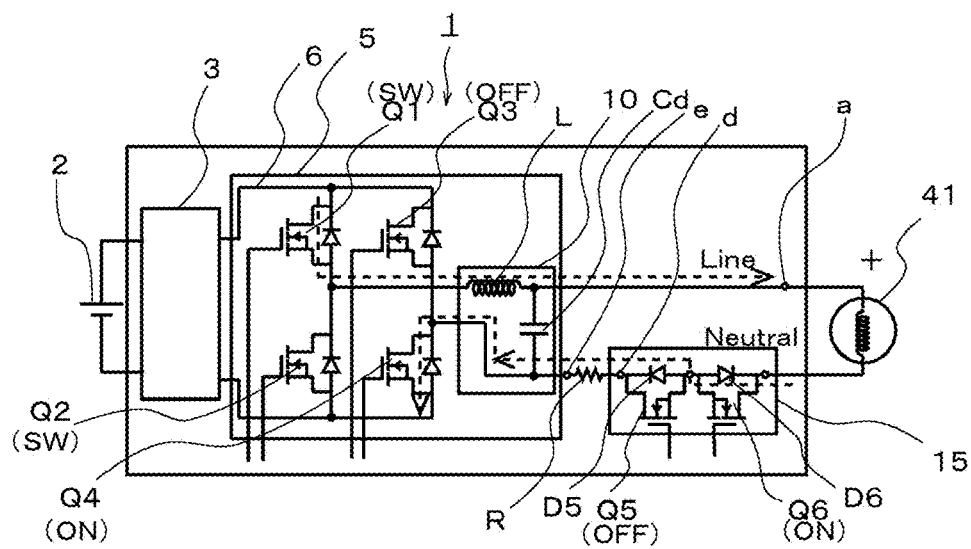
(b)
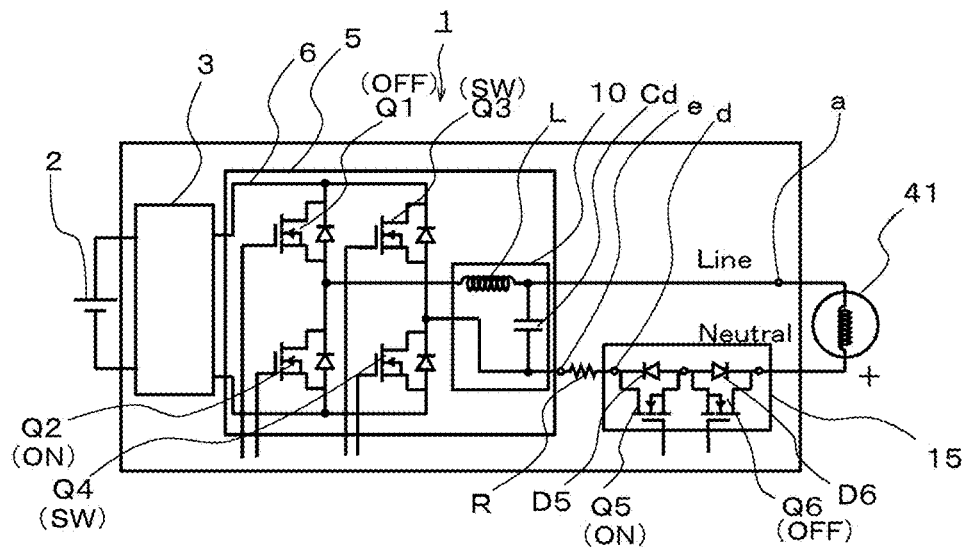
(c)
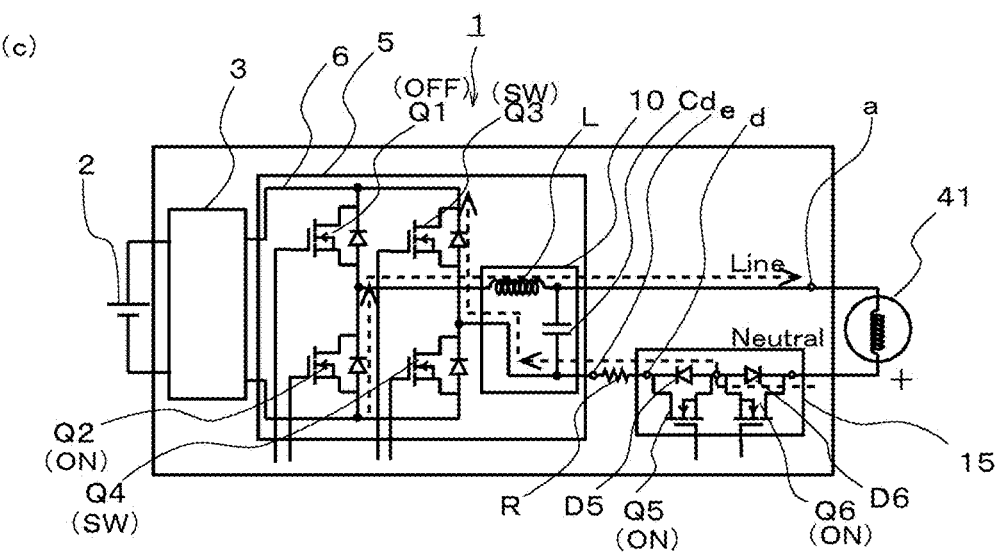

FIG. 9

| VOLTAGE | Line+ | Neutral+ |
|---|---|---|
| CURRENT | N → L | L → N |
| Q1 | SW | OFF |
| Q2 | SW | ON |
| Q3 | OFF | SW |
| Q4 | ON | SW |
| Q5 | ON | ON |
| Q6 | ON | ON |

PARALLEL INVERTER DEVICE

TECHNICAL FIELD

The present invention relates to a parallel inverter device including a DC/AC inverter or the like, and more particularly, to a parallel inverter device with which no control is required between inverter devices during a parallel operation, and addition of the inverter device can be easily performed.

BACKGROUND ART

In an inverter device for outputting AC power, redundancy design is adopted in order to support various usage modes. Accordingly, for an increase or expansion of an output capacity, in some cases, a plurality of inverter devices are connected in parallel to each other and used. When the inverter devices are connected in parallel to each other, a current may flow from an output of one inverter device to an output of another inverter device due to, for example, variations in magnitude of an AC voltage or frequency of an AC voltage of each inverter device or a shift in phase between a load voltage and the AC voltage of the inverter device, which may result in causing a cross current.

For example, in Patent Literature 1, the following inverter device is disclosed. That is, when the inverter devices are operated in parallel to each other, in order to suppress the occurrence of the cross current, reactive powers from mutual inverter devices are mutually transmitted and received by a control line, and target sine wave information holding information on an AC voltage to be output is corrected. The inverter device outputs an AC voltage corresponding to the target sine wave information so that changes in the mutual reactive powers are eliminated.

As an example, a configuration of the related-art inverter devices for performing a parallel operation by connecting the inverter devices to each other by a control line as in Patent Literature 1 is illustrated in FIG. 12. As illustrated in FIG. 12, a plurality of inverter devices 50 are connected in parallel to each other between a DC power supply 2 and a load 40. In order to prevent a cross current indicated by the broken line, a control line 52 for allowing communication and control between the inverter devices 50 is provided.

CITATION LIST

Patent Literature

[PTL 1] JP 2005-102421 A

SUMMARY OF INVENTION

Technical Problem

As described above, when the plurality of inverter devices are connected to each other to be used for the parallel operation, the cross current may be caused due to, for example, variations in magnitude of an AC voltage or frequency of an AC voltage of each inverter device or a shift in phase with respect to a load voltage.

In order to prevent the cross current, it is required that the magnitude of the AC voltage, the timing, or the like between the inverter devices be accurately controlled. In order to meet this demand, as disclosed in Patent Literature 1, a control line for connecting between the inverter devices is required so as to perform accurate control between the inverter devices. In particular, when the number of installed inverter devices performing the parallel operation is increased, the control line for sending analog information on the magnitude of the AC voltage, the timing, or the like is increased in length. Thus, there is a fear in that a signal delay is caused, thereby being incapable of performing accurate control. Accordingly, in order to avoid, for example, a shift of the timing of the control due to the signal delay, the number of connectable inverter devices is limited.

Meanwhile, it is possible to convert the magnitude of the AC voltage, the timing, or the like into digital data to communicate the digital data between the inverter devices, but a communication time period is increased, and a communication mode or a device configuration becomes complicated.

Accordingly, there is a demand for a parallel inverter device with which, among inverter devices, control of a parallel operation accompanied with an increase in power capacity can be easily performed without using a control line for connecting between the inverter devices.

Further, there is a demand for enabling, not only a parallel operation of inverter devices of the same type, but also a parallel operation with a commercial power source or a power generator having a different power supply mode, to be performed.

In view of the above, the present invention has been made to solve the above-mentioned problems, and has an object to provide a parallel inverter device configured as follows. That is, on an output line to which a load is connected, two MOSFETs are arranged in series so as to face each other so that their energization directions are opposite directions. Each MOSFET is set to ON or OFF in accordance with an output current or an AC voltage of the parallel inverter device so that a cross current is interrupted. Further, the parallel inverter device itself can perform control without using a control line. Thus, the parallel operation can be easily performed without limitation on the number of connectable inverter devices.

Solution to Problem

In order to achieve the above-mentioned object, according to at least one embodiment of the present invention, there is provided a parallel inverter device applicable to a parallel operation, the parallel inverter device including: an inverter circuit which includes a switching element, and is configured to perform, based on a PWM output signal generated by a PWM control circuit, switching of output of a DC power supply by switching the switching element to output a pulsed voltage; a filter circuit configured to convert the pulsed voltage output from the inverter circuit into an AC voltage having a sine wave pattern to output the AC voltage; a switcher including a first semiconductor switching element and a second semiconductor switching element which are connected on an output line for causing a current to flow from an output of the filter circuit to a load so that an energization direction of the first semiconductor switching element and an energization direction of the second semiconductor switching element are opposite directions, and are connected in series to the load on the output line; and a controller configured to control ON/OFF of each of the first semiconductor switching element and the second semiconductor switching element included in the switcher based on a polarity of the AC voltage output from the filter circuit and a direction of a current flowing to the load on the output line, wherein the first semiconductor switching element included in the switcher includes a first rectifier element which is connected in parallel to the first semiconductor switching element, and is configured to cause a current to flow in a direction opposite to the energization direction of the first semiconductor switching element, and wherein the second semiconductor switching element included in the switcher includes a second rectifier element which is connected in parallel to the second semiconductor switching element, and is configured to cause a current to flow in a direction opposite to the energization direction of the second semiconductor switching element.

Further, in the parallel inverter device according to the at least one embodiment of the present invention, the first semiconductor switching element and the first rectifier element connected in parallel to the first semiconductor switching element are a MOSFET incorporating a floating diode, and the second semiconductor switching element and the second rectifier element connected in parallel to the second semiconductor switching element are a MOSFET incorporating a floating diode.

Further, in the parallel inverter device according to the at least one embodiment of the present invention, instead of using the MOSFET, the first semiconductor switching element and the second semiconductor switching element are each an insulated gate bipolar transistor (IGBT), and the first rectifier element and the second rectifier element connected in parallel to the first semiconductor switching element and the second semiconductor switching element, respectively, are each a diode.

Further, in the parallel inverter device according to the at least one embodiment of the present invention, the controller is configured to perform control so that, based on the polarity of the AC voltage output from the filter circuit and the direction of the current flowing to the load on the output line, any one of the first semiconductor switching element and the second semiconductor switching element including the first rectifier element and the second rectifier element, respectively, for interrupting a flow of the current of the output line is set to ON and another one thereof is set to OFF.

Further, in the parallel inverter device according to the at least one embodiment of the present invention, the PWM control circuit for generating the PWM output signal is configured to generate the pulsed PWM output signal for driving the switching element of the inverter circuit from a reference sine wave being a signal serving as a reference of a frequency of the AC voltage to be output from the filter circuit, and the PWM control circuit is configured to vary, in response to a signal from the controller, a shift amount of a phase of the reference sine wave and/or a magnitude of an amplitude of the reference sine wave, to thereby change at least one of a duty ratio or timing of output of the PWM output signal.

Further, in the parallel inverter device according to the at least one embodiment of the present invention, the controller is configured to detect, immediately after the polarity of the AC voltage output from the filter circuit is changed, a voltage generated at a terminal into which an energization current flows in one of the first semiconductor switching element and the second semiconductor switching element which is set to OFF, and to detect, based on a magnitude of the detected voltage, a phase difference between a load voltage and the AC voltage output from the filter circuit.

In the parallel inverter device according to the at least one embodiment of the present invention, the controller is configured to control the shift amount of the phase of the reference sine wave of the PWM control circuit in accordance with the magnitude of the detected voltage, immediately after the polarity of the AC voltage output from the filter circuit is changed, so as to adjust a phase of the frequency of the AC voltage output from the filter circuit, to thereby reduce the phase difference between the load voltage and the AC voltage output from the filter circuit.

Further, in the parallel inverter device according to the at least one embodiment of the present invention, the controller is configured to detect, at a peak of the AC voltage output from the filter circuit, a voltage generated at a terminal into which an energization current flows in one of the first semiconductor switching element and the second semiconductor switching element which is set to OFF, and to detect, based on a magnitude of the detected voltage, a voltage difference between a load voltage and the AC voltage output from the filter circuit.

Further, in the parallel inverter device according to the at least one embodiment of the present invention, the controller is configured to control the magnitude of the amplitude of the reference sine wave of the PWM control circuit in accordance with the magnitude of the detected voltage, at the peak of the AC voltage output from the filter circuit, so as to adjust a magnitude of the AC voltage output from the filter circuit, to thereby reduce the voltage difference between the load voltage and the AC voltage output from the filter circuit.

Further, in the parallel inverter device according to the at least one embodiment of the present invention, the controller is configured to detect, immediately after the polarity of the AC voltage output from the filter circuit is changed, whether a current flows through the output line, and to set, when the current flows, both of the first semiconductor switching element and the second semiconductor switching element included in the switcher to ON.

Further, in the parallel inverter device according to the at least one embodiment of the present invention, the switcher includes: the first semiconductor switching element; the first rectifier element connected in parallel to the first semiconductor switching element; a first auxiliary rectifier element which has a forward voltage (Vf) lower than a forward voltage (Vf) of the first rectifier element, and is connected in parallel so as to have the same polarity as a forward-direction polarity of the first rectifier element; the second semiconductor switching element; the second rectifier element connected in parallel to the second semiconductor switching element; and a second auxiliary rectifier element which has a forward voltage (Vf) lower than a forward voltage (Vf) of the second rectifier element, and is connected in parallel so as to have the same polarity as a forward-direction polarity of the second rectifier element.

Further, in the parallel inverter device according to the at least one embodiment of the present invention, the first auxiliary rectifier element and the second auxiliary rectifier element are each a Schottky diode.

Advantageous Effects of Invention

According to the parallel inverter device of the at least one embodiment of the present invention, the switcher includes the first semiconductor switching element including the first rectifier element and being formed of a MOSFET and the second semiconductor switching element including the second rectifier element and being formed of a MOSFET, which are connected on the output line for causing a current to flow from the output of the filter circuit to the load so that their energization directions are opposite directions, and are connected in series to the load on the output line. The ON/OFF of the switcher is controlled based on the polarity of the AC voltage output from the filter circuit and the direction of the current flowing to the load on the output line. In this manner, a current flowing in the opposite direction is interrupted by one MOSFET in the OFF state and a diode connected to the one MOSFET, thereby being capable of preventing the cross current.

Further, according to the parallel inverter device of the at least one embodiment of the present invention, a voltage difference of the voltage generated in the first semiconductor switching element formed of the MOSFET or the voltage generated in the second semiconductor switching element formed of the MOSFET is detected, and the phase difference or the voltage difference between the load voltage and the AC voltage output from the parallel inverter device can be adjusted so as to be reduced. Accordingly, the parallel inverter device itself can perform control into an optimum state in accordance with the state of the load voltage, without causing a cross current.

Further, a control line for communicating to/from another parallel inverter device is not required. Thus, there is no limitation on the number of parallel inverter devices connectable in the parallel operation. Accordingly, a large number of parallel inverter devices can be connected, thereby being capable of easily increasing the capacity.

Further, the parallel operation is performed while adjusting the phase difference or the voltage difference between the load voltage supplied from another parallel inverter device and the AC voltage output from the own parallel inverter device, and hence, not only the parallel operation of parallel inverter devices of the same type, but also the parallel operation with a commercial power source or a power generator having a different power generation mode is enabled to be performed.

BRIEF DESCRIPTION OF DRAWINGS

FIG. 4A and FIG. 4B are diagrams for illustrating a current path of the filter circuit, in which FIG. 4A shows a current path when a polarity of the AC voltage of the filter circuit in a DC/AC inverter unit is positive at a terminal "a", and FIG. 4B shows a current path when the polarity of the AC voltage of the filter circuit is positive at a terminal "e".

FIG. 5 is a table for showing a current direction, an operation state of each of the switching elements Q1, Q2, Q3, and Q4 of the inverter circuit, and an ON/OFF state of each of a first semiconductor switching element Q5 and a second semiconductor switching element Q6 of a switcher, with respect to the AC voltage.

FIG. 8A, FIG. 8B, and FIG. 8C are diagrams for illustrating control of a regenerative current in an inductive load, in which FIG. 8A shows a state in which a current flows from L to N (L→N) under a state in which a Line side is positive, FIG. 8B shows a current interrupting state under a state in which the second semiconductor switching element Q6 is OFF at the time when a supplied voltage has changed so that a Neutral side is positive, and FIG. 8(c) shows a flow of a current under a state in which the first semiconductor switching element and the second semiconductor switching element are ON.

FIG. 9 is a table for showing a current direction, an operation state of each of the switching elements Q1, Q2, Q3, and Q4 of the inverter circuit, and an ON/OFF state of each of the first semiconductor switching element Q5 and the second semiconductor switching element Q6 of the switcher, with respect to the AC voltage in the inductive load.

FIG. 11A and FIG. 11B are diagrams for illustrating another embodiment in connection of the first semiconductor switching element and the second semiconductor switching element of the switcher, in which FIG. 11A is a diagram in which a third semiconductor switching element corresponding to one semiconductor switching element in a switch circuit is provided on the Line side, and a fourth semiconductor switching element corresponding to another semiconductor switching element therein is provided on the Neutral side, and FIG. 11B is a diagram in which the connection is established so that a drain terminal of each of a fifth semiconductor switching element formed of a MOSFET and a sixth semiconductor switching element formed of a MOSFET, which are connected in series to each other in a switch circuit, is positioned on a node side.

DESCRIPTION OF EMBODIMENTS

Now, modes for carrying out a parallel inverter device according to at least one embodiment of the present invention are described with reference to the drawings. The at least one embodiment of the present invention is obtained as follows. On an output line to which a load is connected, two MOSFETs are arranged in series so as to face each other so that their energization directions are opposite directions. Each MOSFET is set to ON or OFF in accordance with an output current or an AC voltage output from the parallel inverter device. In this manner, the parallel inverter device itself performs control so that a cross current is interrupted. Further, the occurrence of the cross current is prevented so that the number of connectable parallel inverter devices is unlimited.

Figure 1:
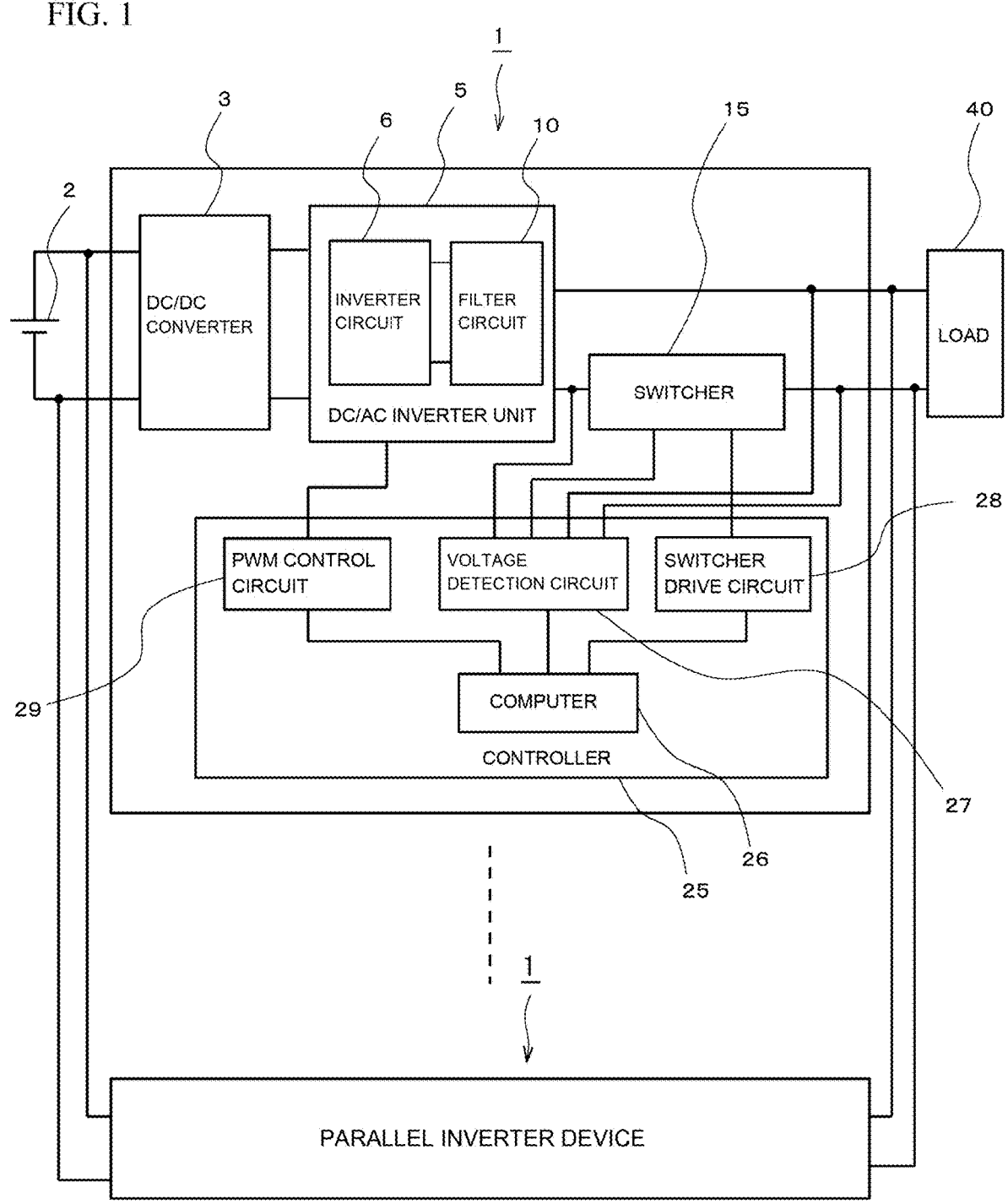
FIG. 1 is a block diagram for illustrating a configuration of a parallel inverter device according to at least one embodiment of the present invention, in which a plurality of parallel inverter devices are connected to each other.
Figure 2:
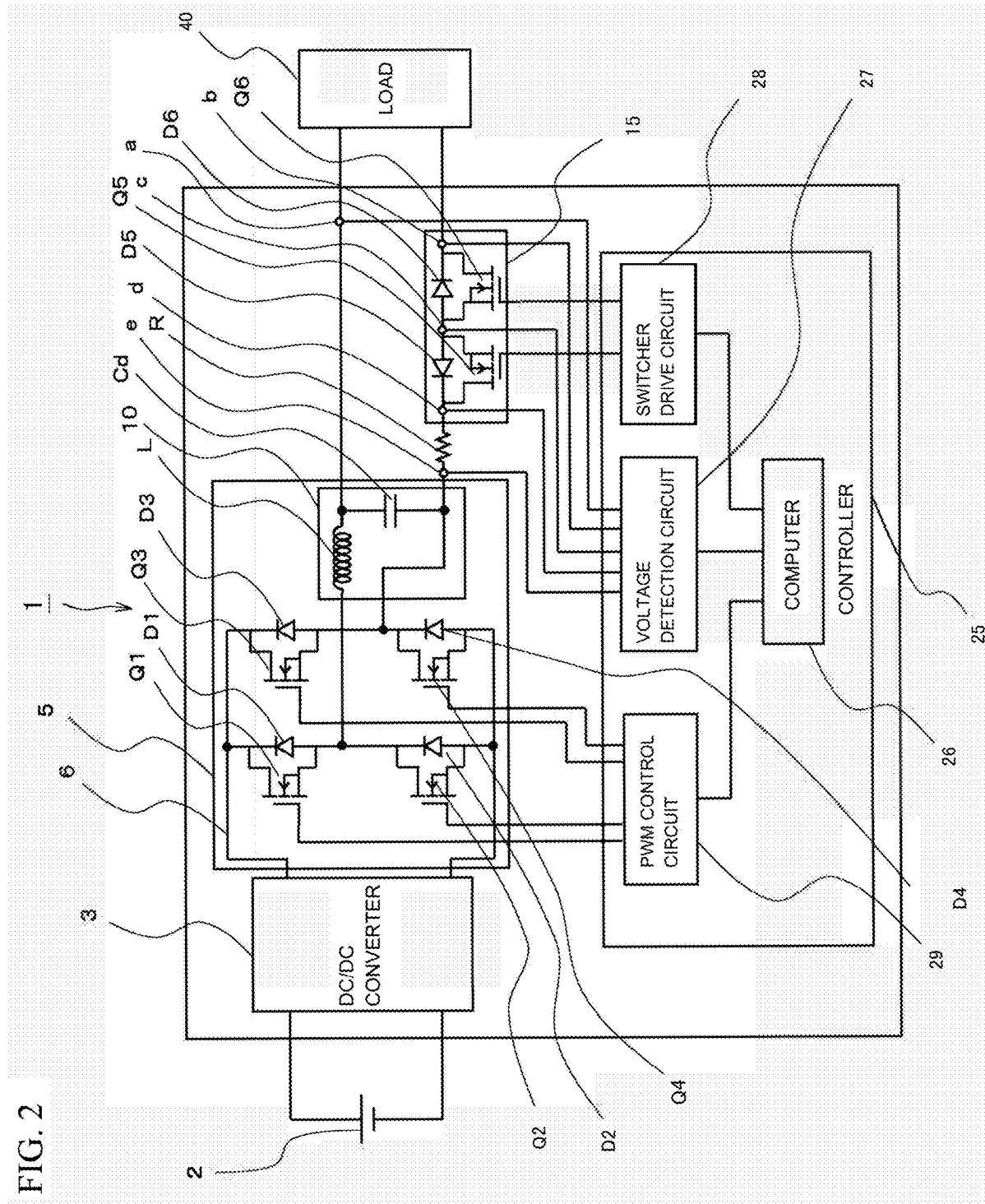
FIG. 2 is a diagram for illustrating a circuit configuration of the parallel inverter device according to the at least one embodiment of the present invention.

FIG. 1 is a block diagram for illustrating a configuration of a parallel inverter device according to the at least one embodiment of the present invention, in which a plurality of parallel inverter devices are connected to each other. FIG. 2 is a diagram for illustrating a circuit configuration of the parallel inverter device according to the at least one embodiment of the present invention.

[Configuration of Parallel Inverter Device]

As illustrated in FIG. 1, a parallel inverter device 1 is configured to perform switching of DC power input from a DC power supply 2 to convert the DC power into AC power having a predetermined voltage, and to supply the AC power to a load 40 or the like. The parallel inverter device 1 includes a DC/DC converter 3, a DC/AC inverter unit 5, a switcher 15, and a controller 25. The DC/DC converter 3 converts the DC power of the DC power supply 2 into DC power having a different voltage. The DC/AC inverter unit 5 includes an inverter circuit 6 and a filter circuit 10. The switcher 15 is provided on an output line for supplying a current to the load 40. The controller 25 includes a PWM control circuit 29, a switcher drive circuit 28, a voltage detection circuit 27, and a computer 26.

Regarding the parallel inverter device 1 illustrated in FIG. 1, a plurality of parallel inverter devices 1 having the same configuration are connected in parallel to the load 40. In the following, description is given of a single parallel inverter device 1.

Now, a circuit forming the parallel inverter device is described in detail with reference to FIG. 2.

FIG. 2 is a diagram for illustrating a circuit configuration of the parallel inverter device according to the at least one embodiment of the present invention. As illustrated in FIG. 2, the DC/AC inverter unit 5 includes the inverter circuit 6 and the filter circuit 10. The inverter circuit 6 performs switching of the DC power input from the DC/DC converter 3, and outputs a pulsed voltage having a positive (also represented by "+") voltage and a negative (also represented by "−") voltage to the filter circuit 10. The inverter circuit 6 includes switching elements Q1, Q2, Q3, and Q4 each formed of a MOSFET. The switching element Q1 and the switching element Q2 are connected in series to the DC/DC converter 3, and the switching element Q3 and the switching element Q4 are connected in series to the DC/DC converter 3. Diodes D1, D2, D3, and D4 connected to the MOSFETs Q1, Q2, Q3, and Q4, respectively, represent floating (also referred to as "parasitic") diodes.

As illustrated in FIG. 2, a node between the switching element Q1 and the switching element Q2 connected in series to each other is connected to one end of an inductor L of the filter circuit 10, and a node between the switching element Q3 and the switching element Q4 connected in series to each other is connected to one end of a capacitor Cd of the filter circuit 10.

Another end of the inductor L of the filter circuit 10 and another end of the capacitor Cd of the filter circuit 10 are connected to each other. The filter circuit 10 removes high frequency components by the inductor L and the capacitor Cd, and outputs an AC voltage from both ends of the capacitor Cd to the load 40.

In this manner, when the switching element Q1 and the switching element Q4 are set to ON (conductive) and the switching element Q3 and the switching element Q2 are set to OFF (interrupted), a current flows through the one end of the inductor L of the filter circuit 10. When the switching element Q3 and the switching element Q2 are set to ON and the switching element Q1 and the switching element Q4 are set to OFF, a current flows through the one end of the capacitor Cd of the filter circuit 10.

The switching element is not limited to a MOSFET, and is only required to be an electronic component capable of performing ON/OFF of a circuit current in response to a control signal. For example, a transistor or an insulated gate bipolar transistor (IGBT) may be used.

[Generation of PWM Output Signal of PWM Control Circuit]

Next, the computer 26 and the PWM control circuit 29 of the controller 25 illustrated in FIG. 2 are described. The computer 26 of the controller 25 is formed of a microcomputer, and performs processing such as control of the PWM control circuit 29 or control of ON/OFF of the switcher 15 by executing, by a CPU (not shown), a program stored in a storage device (not shown).

The PWM control circuit 29 illustrated in FIG. 2 applies a control signal (PWM output signal) to an input of each of the switching elements Q1, Q2, Q3, and Q4, for example, a gate of each MOSFET, to thereby control operations of ON (conductive), OFF (non-conductive), and SW (switching being successive repetition of conductive and non-conductive) of the switching element.

The PWM control circuit 29 is formed of an analog circuit for comparing a reference sine wave, which is a signal serving as a reference of a frequency of an AC voltage to be output from the parallel inverter device, with a carrier wave having a frequency of several tens of KHz. With this analog circuit, a pulsed PWM output signal for driving each of the switching elements Q1, Q2, Q3, and Q4 is generated.

Further, the pulsed PWM output signal can also be generated by computer processing through use of a timer function included in the computer 26, instead of using the analog circuit for comparing the reference sine wave with the carrier wave. The timer function refers to a function of measuring time by counting the number of pulses of a clock by a counter of a timer included in the computer 26.

For example, a duty ratio corresponding to a magnitude of an amplitude of the reference sine wave at the time when one period of the reference sine wave is sampled at predetermined time intervals is stored in time series into the storage device of the computer 26. The timer of the computer 26 is driven based on the clock, and after a predetermined time period elapses from when the timer counts the number of pulses, the CPU reads out the next duty ratio from the storage device, and controls the timer. For example, in a case in which the predetermined time interval of the sampling corresponds to the number of pulses of the clock of 100, the CPU first outputs ON as the PWM output signal when the duty ratio is 0.5. When the number of pulses of the counter of the timer reaches 50, the CPU outputs OFF as the PWM output signal, and outputs OFF as the PWM output signal in a period in which the number of pulses of the counter is from 51 to 100. After that, the CPU reads out the next duty ratio from the storage device, and controls the timer in accordance with the duty ratio. In this manner, the pulsed PWM output signal is generated in accordance with the duty ratio corresponding to the magnitude of the amplitude of the reference sine wave.

Figure 3:
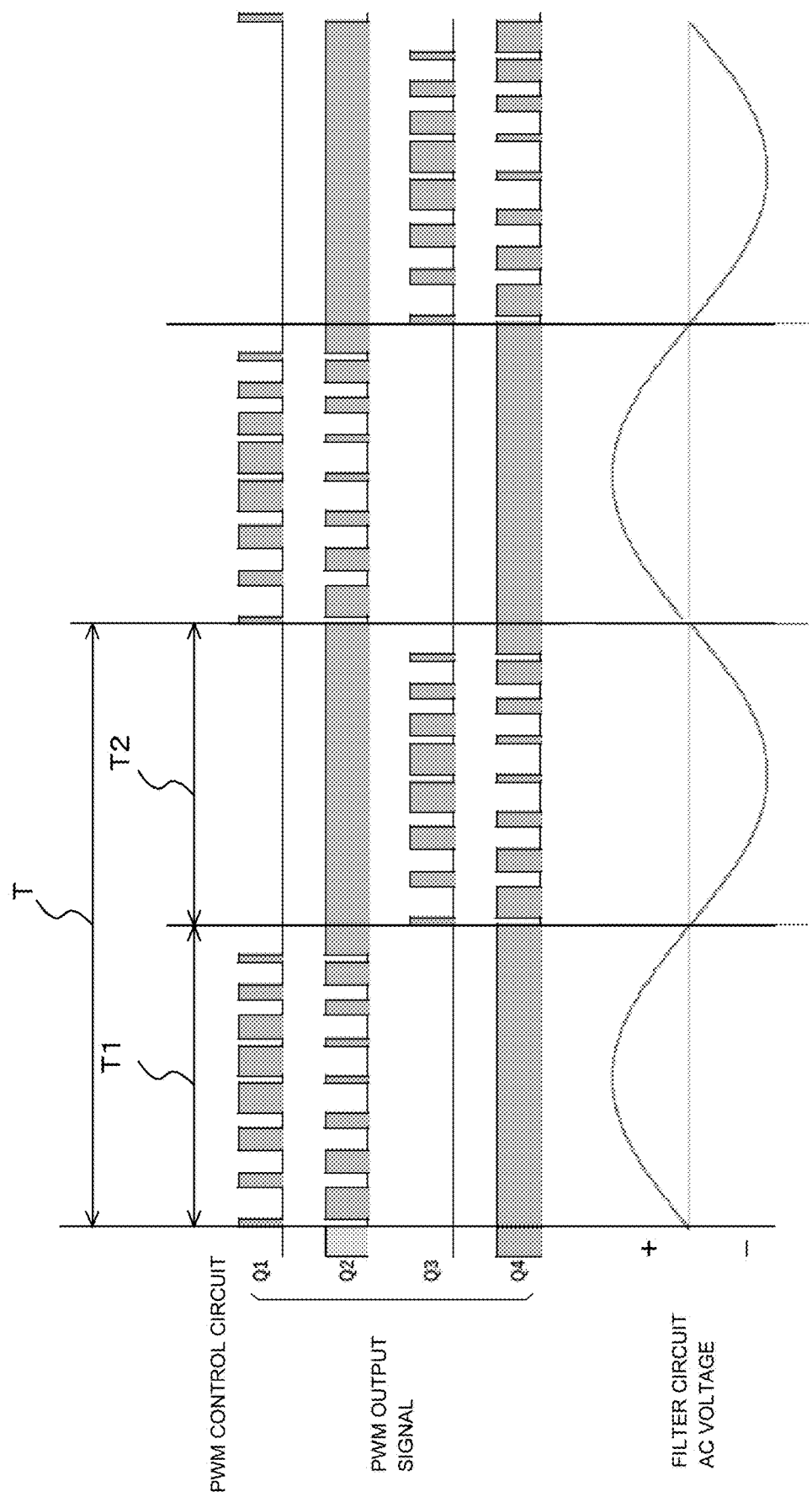
FIG. 3 is a chart for illustrating changes of waveforms of PWM output signals to be input to switching elements Q1, Q2, Q3, and Q4 of an inverter circuit, and an AC voltage to be output from both ends of a capacitor of a filter circuit.

FIG. 3 is a chart for illustrating changes of waveforms of PWM output signals to be input to the switching elements Q1, Q2, Q3, and Q4 of the inverter circuit 6, and an AC voltage to be output from both ends of the capacitor Cd of the filter circuit 10.

As illustrated in FIG. 3, in a period represented by T1 in which the voltage is output to the positive side from the filter circuit 10, the PWM control circuit 29 performs control so that the switching element Q1 and the switching element Q2 alternately repeat the switching operation in response to the PWM output signals whose duty ratios have been changed, which are generated from the carrier wave of several tens of KHz. Further, the PWM control circuit 29 performs control so that the switching element Q3 is brought into the OFF state and the switching element Q4 is brought into the ON state.

Meanwhile, as illustrated in FIG. 3, in a period represented by T2 in which the voltage is output to the negative side from the filter circuit 10, the PWM control circuit 29 performs control so that the switching element Q3 and the switching element Q4 alternately repeat the switching operation in response to the PWM output signals whose duty ratios have been changed, which are generated from the carrier wave of several tens of KHz. Further, the PWM control circuit 29 performs control so that the switching element Q1 is brought into the OFF state and the switching element Q2 is brought into the ON state.

The inverter circuit 6 of the DC/AC inverter unit 5 performs switching of a DC voltage from the DC/DC converter 3 in response to a drive signal from the PWM control circuit 29 to convert the DC voltage into pulsed positive and negative voltages, and inputs the voltage pulse train obtained through the conversion to the filter circuit 10. The filter circuit 10 removes high frequency components of the pulsed voltage output from the inverter circuit 6, and outputs an AC voltage to the load 40. In this manner, an AC voltage having a period T is output from the filter circuit 10.

[Control of PWM Output Signal of PWM Control Circuit]

The PWM control circuit 29 includes a signal generator (not shown) for generating a reference sine wave serving as a reference of a frequency of the AC voltage to be output to the load 40. The signal generator can vary the magnitude of the amplitude of the reference sine wave depending on the magnitude of the voltage input from the computer 26. When the magnitude of the amplitude of the reference sine wave is varied, the duty ratio of the PWM output signal for driving the switching element is changed.

Further, the magnitude of the voltage to be output from the filter circuit 10 becomes larger as the duty ratio in the PWM output signal for driving each of the switching element Q1 and the switching element Q3 at the time of switching becomes larger. In this manner, the duty ratio of the frequency to be output from the PWM control circuit 29 is controlled so that the magnitude of the voltage to be supplied to the load 40 can be changed. As described above, when the duty ratio of the PWM output signal is changed, the magnitude of the AC voltage to be output from the filter circuit 10 can be adjusted.

For example, in a case in which there is a voltage difference between the magnitude of the load voltage generated in the load 40 and the magnitude of the AC voltage output from the filter circuit 10 of the parallel inverter device 1 when the plurality of parallel inverter devices 1 are operated in parallel, the magnitude of the amplitude of the reference sine wave to be generated by the signal generator of the PWM control circuit 29 is changed. In this manner, the voltage difference between the load voltage and the AC voltage output from the filter circuit 10 of the parallel inverter device 1 can be reduced.

Further, the signal generator of the PWM control circuit 29 includes a phase shift circuit (not shown) for shifting a phase of the reference sine wave. The phase of the reference sine wave can be varied depending on a magnitude of a voltage for correction to be input from the computer 26.

In this manner, for example, in a case in which there is a phase difference as a result of comparison between a phase of the load voltage generated in the load and a phase of the AC voltage output from the filter circuit 10 of the parallel inverter device when the plurality of parallel inverter devices are operated in parallel, the phase of the reference sine wave to be generated by the signal generator of the PWM control circuit 29 is changed. In this manner, the phase difference between the load voltage generated in the load and the AC voltage output from the filter circuit 10 of the parallel inverter device 1 can be reduced.

As described above, the PWM control circuit 29 can vary the magnitude of the AC voltage and the phase of the AC voltage to be output from the filter circuit 10, based on the magnitude of the voltage for correction to be input from the computer 26.

[Configuration of Switcher]

Next, the switcher provided on the output line for causing a current to flow from the filter circuit of the DC/AC inverter unit to the load is described.

As illustrated in FIG. 2, the switcher 15 is provided on the output line for causing a current to flow from the output of the filter circuit 10 to the load 40, and includes a first semiconductor switching element Q5 and a second semiconductor switching element Q6 which are connected so that their energization directions are opposite directions, and are connected in series to the load on the output line.

Further, the first semiconductor switching element Q5 included in the switcher 15 includes a first diode D5 (first rectifier element D5) which is connected in parallel to the first semiconductor switching element Q5, and causes a current to flow in a direction opposite to the energization direction of the first semiconductor switching element Q5. The second semiconductor switching element Q6 included in the switcher 15 includes a second diode D6 (second rectifier element D6) which is connected in parallel to the second semiconductor switching element Q6, and causes a current to flow in a direction opposite to the energization direction of the second semiconductor switching element Q6.

As the first semiconductor switching element Q5 and the first diode D5 connected in parallel to the first semiconductor switching element Q5, and the second semiconductor switching element Q6 and the second diode D6 connected in parallel to the second semiconductor switching element Q6, MOSFETs incorporating floating diodes are suitably used.

Further, the first semiconductor switching element Q5 and the second semiconductor switching element Q6 may be insulated gate bipolar transistors (IGBTs). When the IGBTs are used as the first semiconductor switching element Q5 and the second semiconductor switching element Q6, a diode for causing a current to flow in a direction opposite to an energization direction of the IGBT is provided at both ends of each IGBT.

Further, on the output line for causing the current to flow, a shunt resistor R for measuring the current flowing through the output line is connected.

Further, as illustrated in FIG. 2, the parallel inverter device 1 includes the voltage detection circuit 27 for measuring the AC voltage output from the filter circuit 10, the load voltage, and an output current. The voltage detection circuit 27 outputs the result to the computer 26 via an AD converter (not shown) for converting an analog amount corresponding to the detected voltage value into a digital value.

Further, the voltage detection circuit 27 can also measure a voltage generated across both ends of the first semiconductor switching element Q5 (between the source and the drain of the MOSFET) and a voltage generated across both ends of the second semiconductor switching element Q6.

The computer 26 controls ON/OFF of the switcher 15 based on the polarity of the AC voltage output from the filter circuit 10 in the DC/AC inverter unit 5 and the direction of the current flowing to the load on the output line. An output signal of the computer 26 for performing the ON/OFF control of the switcher 15 is input to each of the first semiconductor switching element Q5 and the second semiconductor switching element Q6 via the switcher drive circuit 28.

[Voltage and Current Measurement on Output Line]

Next, voltage measurement and current measurement in the controller for controlling the switcher are described.

As illustrated in FIG. 2, on the output line for outputting power from the filter circuit 10 to the load 40, terminals "a", "b", "c", "d", and "e" for voltage measurement and current measurement are provided. Each of the terminals is connected to an input portion of the voltage detection circuit 27.

The voltage detection circuit 27 measures the load voltage across both ends of the load 40 from the terminal "a" and the terminal "b", and measures the AC voltage output from the filter circuit 10 of the DC/AC inverter unit 5 from the terminal "a" and the terminal "e". Further, the voltage detection circuit 27 measures a current flowing to the load 40 on the output line by measuring a voltage across both ends of the shunt resistor from the terminal "d" and the terminal "e" located at both ends of the shunt resistor R.

[Current Path on Output Line]

Next, control of the first semiconductor switching element connected on the filter circuit side of the switcher and the second semiconductor switching element connected on the load side of the switcher, which is performed by the controller, is described with reference to FIG. 4A and FIG. 4B. FIG. 4A and FIG. 4B are diagrams for illustrating a current path of the filter circuit. FIG. 4A shows a current path when the polarity of the AC voltage of the filter circuit 10 in the DC/AC inverter unit 5 is positive at the terminal "a". FIG. 4B shows a current path when the polarity of the AC voltage of the filter circuit 10 is positive at the terminal "e".

In FIG. 4A and FIG. 4B, a path on the output line from a node between the capacitor Cd and the inductor L of the filter circuit 10 to one terminal of the load 40 is represented by "Line," and a path from the one end of the capacitor Cd to another terminal of the load 40 is represented by "Neutral."

The voltage detection circuit 27 measures the AC voltage output from the filter circuit 10 from the terminal "a" and the terminal "e", and outputs the result to the computer 26. When the polarity of the AC voltage of the filter circuit 10 is positive at the terminal "a", the switching elements Q1 and Q2 are in the switching state (represented by "SW"), the switching element Q3 is in the OFF state, and the switching element Q4 is in the ON state. This situation corresponds to the period T1 illustrated in FIG. 3. When the terminal "a" is positive, "+" is marked on one side on the load 40 side, and "Line+" is achieved.

The controller 25 sets the first semiconductor switching element Q5 to OFF and the second semiconductor switching element Q6 to ON. In this manner, as illustrated in FIG. 4A, a current indicated by the broken line from the terminal "a" flows through the load so as to return to the terminal "e". Further, a magnitude of the current and a direction of the current flowing through the circuit can be measured based on the voltage across the terminals "d" and "e" at both ends of the shunt resistor R.

Meanwhile, when the polarity of the AC voltage of the filter circuit 10 is positive at the terminal "e", the switching elements Q3 and Q4 are in the switching state, the switching element Q1 is in the OFF state, and the switching element Q2 is in the ON state. This situation corresponds to the period T2 illustrated in FIG. 3. When the terminal "e" is positive, "+" is marked on another side on the load 40 side, and "Neutral+" is achieved.

The computer 26 of the controller 25 sets the first semiconductor switching element Q5 to ON and the second semiconductor switching element Q6 to OFF. In this manner, as illustrated in FIG. 4B, a current indicated by the broken line from the terminal "e" flows through the load so as to return to the terminal "a". Further, the magnitude of the current and the direction of the current flowing through the circuit can be measured based on the voltage across the terminals "d" and "e" at both ends of the shunt resistor R.

[Control of Switcher with Respect to AC Voltage]

The switching operation of the DC/AC inverter unit and the ON/OFF state of each of the first semiconductor switching element and the second semiconductor switching element of the switcher with respect to the AC voltage described above are shown in FIG. 5.

FIG. 5 is a table for showing the current direction, the operation state of each of the switching elements Q1, Q2, Q3, and Q4 of the inverter circuit 6, and the ON/OFF state of each of the first semiconductor switching element Q5 and the second semiconductor switching element Q6 of the switcher, with respect to the AC voltage output from the filter circuit 10.

As shown in FIG. 5, when the polarity of the AC voltage output from the filter circuit 10 is positive at the terminal "a" (represented by "Line+" in FIG. 5), the current flows from the Line side to the Neutral side (represented by "L→N" in FIG. 5). Further, the switching elements Q1 and Q2 of the inverter circuit 6 are in the SW state representing the switching operation, the switching element Q3 is in the OFF state, and the switching element Q4 is in the ON state. This period corresponds to T1 illustrated in FIG. 3. Further, the first semiconductor switching element Q5 is set to OFF, and the second semiconductor switching element Q6 is set to ON.

Meanwhile, when the polarity of the AC voltage output from the filter circuit 10 is positive at the terminal "e" (represented by "Neutral+" in FIG. 5), as shown in FIG. 5, the current flows from the Neutral side to the Line side (represented by "N→L" in FIG. 5). Further, the switching elements Q3 and Q4 of the inverter circuit 6 are in the SW state representing the switching operation, the switching element Q1 is in the OFF state, and the switching element Q2 is in the ON state. This period corresponds to T2 illustrated in FIG. 3. Further, the first semiconductor switching element Q5 is set to ON, and the second semiconductor switching element Q6 is set to OFF.

[Interruption Operation of Cross Current on Output Line]

Next, interruption of a cross current generated during a parallel operation performed by connecting a plurality of parallel inverter devices to each other is described.

For example, when there is caused a cross current flowing such that the direction of the current illustrated in FIG. 4A is opposite in the period T1 illustrated in FIG. 3, the cross current is prevented because the first semiconductor switching element Q5 is OFF, and further the direction in which the cross current flows is opposite to the forward direction of the first diode D5, thereby preventing the current to flow in the opposite direction by the first semiconductor switching element Q5 and the first diode D5.

Further, when there is caused a cross current flowing such that the direction of the current illustrated in FIG. 4(b) is opposite in the period T2 illustrated in FIG. 3, the cross current is prevented because the second semiconductor switching element Q6 is OFF, and further the direction in which the cross current flows is opposite to the forward direction of the second diode D6, thereby preventing the current to flow in the opposite direction by the second semiconductor switching element Q6 and the second diode D6.

As described above, the controller 25 performs control so that, based on the polarity of the AC voltage output from the filter circuit 10 and the direction of the current flowing to the load on the output line, any one of the first semiconductor switching element Q5 and the second semiconductor switching element Q6 including the first diode and the second diode, respectively, for interrupting the flow of the current of the output line is set to ON and another one thereof is set to OFF. Thus, a backflow (cross current) can be prevented.

[Prevention of Occurrence of Cross Current]

Next, control of preventing the cross current to be caused by the parallel operation of the parallel inverter devices is described. The cross current to be caused by the parallel operation is a reactive current. The occurrence of the cross current causes supply imbalance of power of each parallel inverter device and reduction in efficiency of power supply. Thus, prevention of the occurrence of the cross current is demanded.

In the parallel operation, the plurality of parallel inverter devices are connected to the load. Accordingly, when there is a phase difference between the load voltage and the AC voltage output from the parallel inverter device, and further when there is a voltage difference between the magnitude of the load voltage and the magnitude of the AC voltage output from the parallel inverter device, a cross current is caused in the parallel inverter device.

[Correction of Phase Difference Between AC Voltage and Load Voltage]

Figure 6:
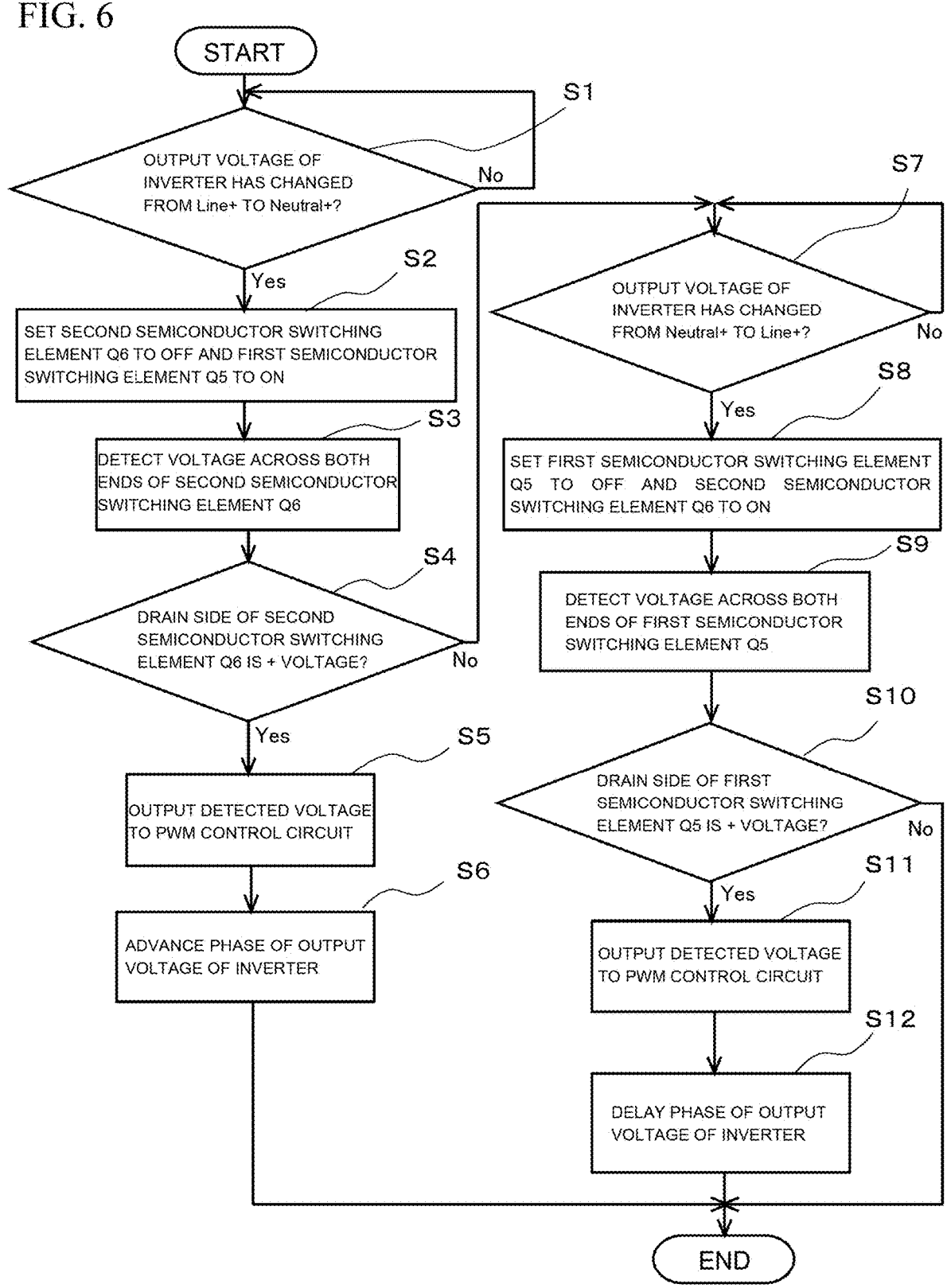
FIG. 6 is a flow chart for illustrating processing of detecting a phase difference between a load voltage and the AC voltage output from the parallel inverter device, and correcting the phase difference.

First, a correction method of detecting the phase difference between the load voltage and the AC voltage output from the parallel inverter device and reducing the phase difference is described with reference to FIG. 6. FIG. 6 is a flow chart for illustrating processing of detecting the phase difference between the load voltage and the AC voltage output from the parallel inverter device and correcting the phase difference.

As illustrated in FIG. 6, the computer 26 of the controller 25 checks whether the polarity of the AC voltage output from the filter circuit 10 of the parallel inverter device 1 has changed from Line+ illustrated in FIG. 4A to Neutral+ illustrated in FIG. 4B (Step S1). After confirming that the polarity has changed to Neutral+, the computer 26 sets the second semiconductor switching element Q6 to OFF and the first semiconductor switching element Q5 to ON (Step S2).

After that, the voltage detection circuit 27 detects the voltage across both ends of the second semiconductor switching element Q6 (Step S3). It is checked whether the voltage on the drain side of the second semiconductor switching element Q6 detected by the voltage detection circuit 27 is a "+" voltage (Step S4).

When it is determined that the voltage on the drain side of the second semiconductor switching element Q6 is the "+" voltage (Yes in Step S4), it means that the phase difference between the load voltage and the AC voltage output from the filter circuit 10 has been detected. The phase difference is caused because the phase of the AC voltage output from the filter circuit 10 is delayed with respect to the phase of the load voltage. The computer 26 outputs, to the PWM control circuit 29, the magnitude of the phase difference between the load voltage and the AC voltage output from the filter circuit 10 as, for example, a voltage value of "+" (Step S5).

The PWM control circuit 29 advances the phase of the reference sine wave in accordance with the magnitude of the voltage value obtained from the computer 26. In this manner, the phase of the AC voltage output from the filter circuit 10 is corrected so as to be advanced (Step S6).

Meanwhile, when it is determined that the voltage on the drain side of the second semiconductor switching element Q6 is not the "+" voltage (No in Step S4), the computer 26 checks whether the polarity of the AC voltage output from the filter circuit 10 of the parallel inverter device 1 has changed from Neutral+ illustrated in FIG. 4B to Line+ illustrated in FIG. 4A (Step S7).

After confirming that the polarity has changed to Line+, the computer 26 sets the first semiconductor switching element Q5 to OFF and the second semiconductor switching element Q6 to ON (Step S8). After that, the voltage detection circuit 27 detects the voltage across both ends of the first semiconductor switching element Q5 (Step S9).

The computer 26 checks whether the voltage on the drain side of the first semiconductor switching element Q5 detected by the voltage detection circuit 27 is a "+" voltage (Step S10). When it is determined that the voltage on the drain side of the first semiconductor switching element Q5 is the "+" voltage (Yes in Step S10), it means that the phase difference between the load voltage and the AC voltage output from the filter circuit 10 has been detected. The phase difference is caused because the phase of the AC voltage output from the filter circuit 10 is advanced with respect to the phase of the load voltage. The computer 26 outputs, to the PWM control circuit 29, the magnitude of the phase difference between the load voltage and the AC voltage output from the filter circuit 10 as, for example, a voltage value of "−" (negative) (Step S11).

The PWM control circuit 29 delays the phase of the reference sine wave in accordance with the magnitude of the voltage value obtained from the computer 26 (Step S12). In this manner, the phase of the AC voltage output from the filter circuit 10 is corrected so as to be delayed.

Further, when it is determined that the voltage on the drain side of the first semiconductor switching element Q5 is not the "+" voltage (No in Step S10), it is determined that there is no phase difference between the load voltage and the AC voltage output from the filter circuit 10, and the processing is ended.

As a result of reducing the phase difference between the load voltage and the AC voltage output from the filter circuit 10, the occurrence of the cross current can be prevented.

[Correction of Voltage Difference Between AC Voltage and Load Voltage]

Figure 7:
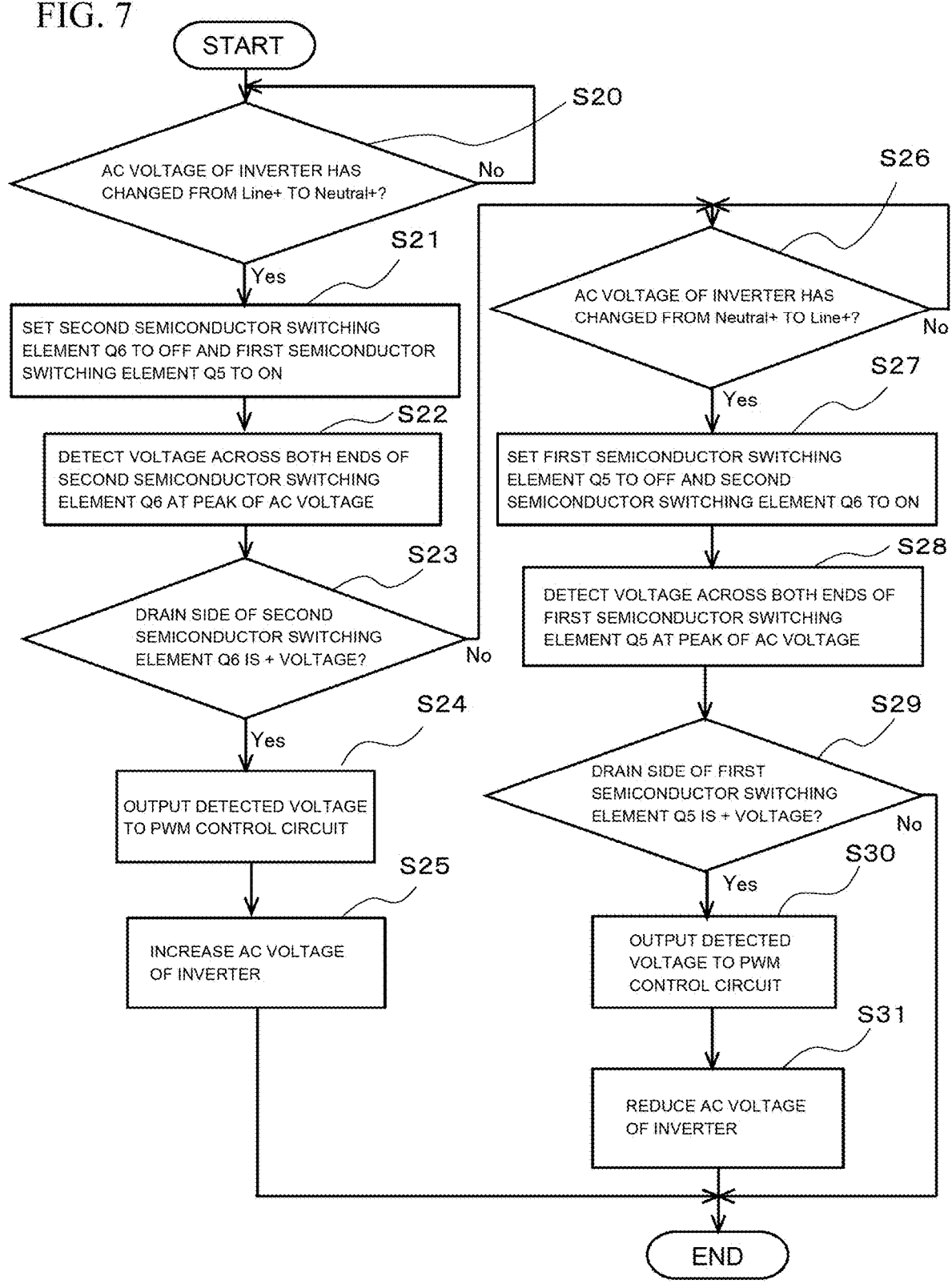
FIG. 7 is a flow chart for illustrating processing of detecting a voltage difference between the load voltage and the AC voltage output from the parallel inverter device, and correcting the voltage difference.

Next, correction control of detecting the voltage difference between the load voltage and the AC voltage output from the parallel inverter device and reducing the voltage difference is described with reference to FIG. 7. FIG. 7 is a flow chart for illustrating processing of detecting the voltage difference between the load voltage and the AC voltage output from the parallel inverter device and correcting the voltage difference.

As illustrated in FIG. 7, the computer 26 of the controller 25 checks whether the polarity of the AC voltage output from the filter circuit 10 of the parallel inverter device 1 has changed from Line+ illustrated in FIG. 4A to Neutral+ illustrated in FIG. 4B (Step S20). After confirming that the polarity has changed to Neutral+, the computer 26 sets the second semiconductor switching element Q6 to OFF and the first semiconductor switching element Q5 to ON (Step S21).

After that, the voltage detection circuit 27 detects the voltage across both ends of the second semiconductor switching element Q6 at a peak of the AC voltage (Step S22). For example, the voltage detection circuit 27 detects the voltage across both ends of the second semiconductor switching element Q6 at a peak after an elapse of a predetermined time period from when the polarity of the AC voltage has changed. It is checked whether the voltage on the drain side of the second semiconductor switching element Q6 detected by the voltage detection circuit 27 is a "+" voltage (Step S23).

When it is determined that the voltage on the drain side of the second semiconductor switching element Q6 is the "+" voltage (Yes in Step S23), it means that the voltage difference between the load voltage and the AC voltage output from the filter circuit 10 has been detected. The voltage difference is caused because the voltage value of the AC voltage output from the filter circuit 10 is lower than the voltage value of the load voltage. The computer 26 outputs, to the PWM control circuit 29, the magnitude of the voltage difference between the load voltage and the AC voltage output from the filter circuit 10 as, for example, a voltage value of "+" (Step S24).

The PWM control circuit 29 increases the amplitude of the reference sine wave in accordance with the magnitude of the voltage value obtained from the computer 26. In this manner, the voltage value of the AC voltage output from the filter circuit 10 is corrected so as to be increased (Step S25).

Meanwhile, when it is determined that the voltage on the drain side of the second semiconductor switching element Q6 is not the "+" voltage (No in Step S23), the computer 26 checks whether the polarity of the AC voltage output from the filter circuit 10 of the parallel inverter device 1 has changed from Neutral+ illustrated in FIG. 4B to Line+ illustrated in FIG. 4A (Step S26).

After confirming that the polarity has changed to Line+, the computer 26 sets the first semiconductor switching element Q5 to OFF and the second semiconductor switching element Q6 to ON (Step S27). After that, the voltage detection circuit 27 detects the voltage across both ends of the first semiconductor switching element Q5 at a peak of the AC voltage (Step S28). For example, the voltage detection circuit 27 detects the voltage across both ends of the first semiconductor switching element Q5 at a peak after an elapse of a predetermined time period from when the polarity of the AC voltage has changed.

The computer 26 checks whether the voltage on the drain side of the first semiconductor switching element Q5 detected by the voltage detection circuit 27 is a "+" voltage (Step S29). When it is determined that the voltage on the drain side of the first semiconductor switching element Q5 is the "+" voltage (Yes in Step S29), it means that the voltage difference between the load voltage and the AC voltage output from the filter circuit 10 has been detected. The voltage difference is caused because the magnitude of the AC voltage output from the filter circuit 10 is larger than the magnitude of the load voltage. The computer 26 outputs, to the PWM control circuit 29, the magnitude of the voltage difference between the load voltage and the AC voltage output from the filter circuit 10 as, for example, a voltage value of "−" (negative) (Step S30).

The PWM control circuit 29 decreases the amplitude of the reference sine wave in accordance with the magnitude of the voltage value obtained from the computer 26. In this manner, the magnitude of the AC voltage output from the filter circuit 10 is corrected so as to be decreased (Step S31).

Further, when it is determined that the voltage on the drain side of the first semiconductor switching element Q5 is not the "+" voltage (No in Step S29), it is determined that there is no voltage difference between the load voltage and the AC voltage output from the filter circuit 10, and the processing is ended.

As a result of reducing the voltage difference between the load voltage and the AC voltage output from the filter circuit 10, the occurrence of the cross current can be prevented.

[Control of Switcher in Inductive Load]

Next, control in a case in which the parallel inverter device supplies power to an inductive load is described. For example, when power is supplied to a load including an inductor, for example, a motor, a phase difference is caused between the supplied voltage and a current flowing through the load, which causes a state in which the current is temporally delayed with respect to the voltage. Accordingly, even when the polarity of the supplied voltage is changed, the flow direction of the current is not immediately reversed, and the current flows in a manner of maintaining the state before the polarity of the voltage is changed.

[Control of Regenerative Current]

Now, control of a regenerative current is described with reference to FIG. 8A to FIG. 8C. FIG. 8A to FIG. 8C are diagrams for illustrating control of a regenerative current in the inductive load. FIG. 8A shows a state in which a current flows from L to N (L→N) under a state in which the Line side is positive. FIG. 8B shows a current interrupting state under a state in which the second semiconductor switching element Q6 is OFF at the time when the supplied voltage has changed so that the Neutral side is positive. FIG. 8C is a diagram for illustrating a flow of a current under a state in which the first semiconductor switching element and the second semiconductor switching element are ON.

The flow of the current indicated by the broken line of FIG. 8A represents a state in which the current flows from L to N (L→N) under a state in which the Line side is positive. In a case in which power is supplied to an inductive load 41, when the state illustrated in FIG. 8A has changed to the state illustrated in FIG. 8B, that is, when the supplied voltage has changed so that the Neutral side is positive, the second semiconductor switching element Q6 connected to the inductive load 41 side is set to OFF. Thus, the flow of the current illustrated in FIG. 8A is interrupted by the second semiconductor switching element Q6 in the OFF state. Further, the current flow is opposite to the forward direction of the second diode D6, and hence no current flows through the output line. Accordingly, when the polarity of the supplied voltage supplied from the parallel inverter device has changed, it is detected whether a regenerative current flows. When the regenerative current flows, the switcher 15 is controlled so that a current is caused to flow to the power supply side.

As the detection of the regenerative current, first, the computer 26 of the controller 25 checks whether the polarity of the AC voltage output from the filter circuit 10 has been reversed through use of the voltage detection circuit 27. After detecting the reversion of the polarity of the AC voltage, the computer 26 checks whether a current flows through the circuit through use of the voltage detection circuit 27. Further, the computer 26 also checks a direction in which the current flows.

When a current flows, as illustrated in FIG. 8C, the controller 25 outputs a signal to the switcher drive circuit 28 so that the first semiconductor switching element Q5 and the second semiconductor switching element Q6 of the switcher 15 are set to ON. In this manner, as illustrated in FIG. 8C, the regenerative current indicated by the broken line passes through the second semiconductor switching element Q6 on the output line to flow through the DC/AC inverter unit 5.

The state of each switching element with respect to the voltage and the current flow in the current control described above is shown in FIG. 9. FIG. 9 is a table for showing the current direction, the operation state of each of the switching elements Q1, Q2, Q3, and Q4 of the inverter circuit, and the ON/OFF state of each of the first semiconductor switching element Q5 and the second semiconductor switching element Q6 of the switcher, with respect to the AC voltage in the inductive load 41.

As shown in FIG. 9, when the AC voltage output from the parallel inverter device is "Line+" and the current direction is "N→L", and when the AC voltage is "Neutral+" and the current direction is "L→N", both of the first semiconductor switching element Q5 and the second semiconductor switching element Q6 are set to ON. In this manner, a current can be caused to flow as a regenerative current to the DC power supply side without blocking the flow of the current in the inductive load.

[Other Configuration of Switcher]

Figure 10:
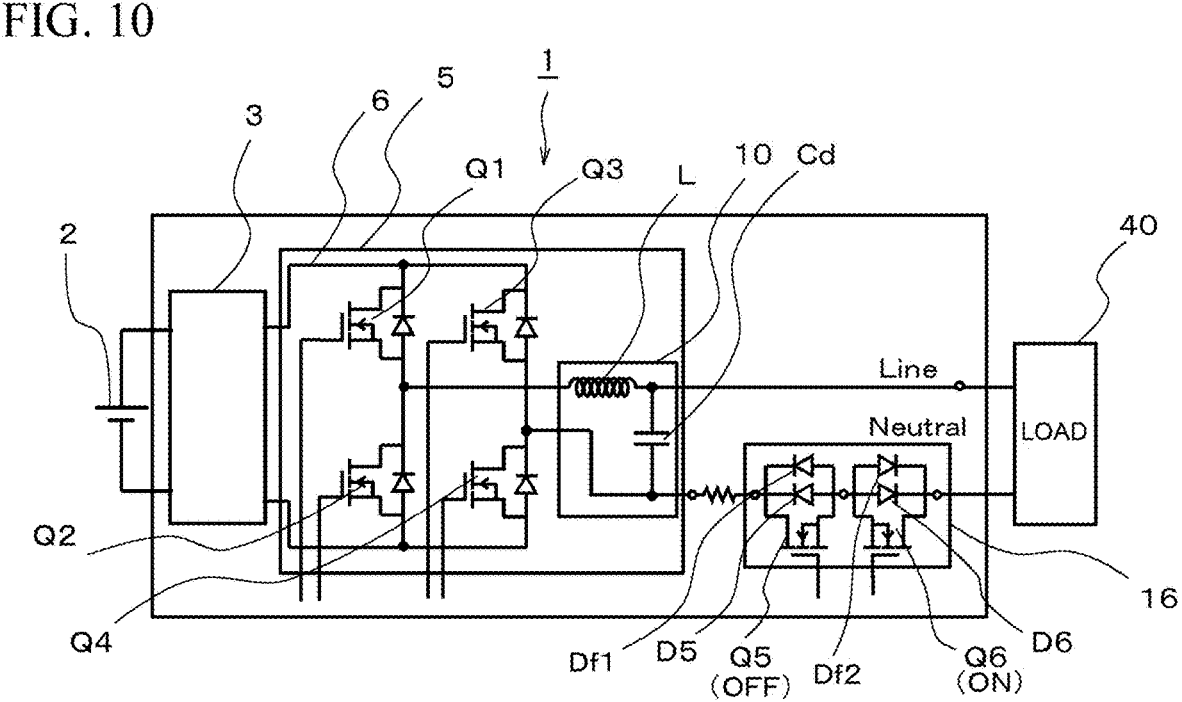
FIG. 10 is a diagram for illustrating a circuit in which a Schottky diode is connected to each of the first semiconductor switching element and the second semiconductor switching element of the switcher.

Next, a configuration in which an auxiliary diode, for example, a Schottky diode, is connected to each of the first semiconductor switching element and the second semiconductor switching element of the switcher so that power loss is reduced is described with reference to FIG. 10. FIG. 10 is a diagram for illustrating a circuit in which the Schottky diode is connected to each of the first semiconductor switching element and the second semiconductor switching element of the switcher.

As illustrated in FIG. 10, a switcher 16 includes the first semiconductor switching element Q5, the first diode D5 connected in parallel to the first semiconductor switching element Q5, a first auxiliary rectifier element (Schottky diode) Df1, the second semiconductor switching element Q6, the second diode D6 connected in parallel to the second semiconductor switching element Q6, and a second auxiliary rectifier element (Schottky diode) Df2. The first auxiliary rectifier element (Schottky diode) Df1 has a forward voltage (Vf) lower than a forward voltage (Vf) of the first diode D1, and is connected to the first diode D1 so as to have the same polarity as a forward-direction polarity of the first diode D5. The second auxiliary rectifier element (Schottky diode) Df2 has a forward voltage (Vf) lower than a forward voltage (Vf) of the second diode D6, and is connected to the second diode D6 so as to have the same polarity as a forward-direction polarity of the second diode D6.

When a current flows in the forward direction through the diode connected in parallel to each of the first semiconductor switching element Q5 and the second semiconductor switching element Q6, there is a fear in that power loss is caused by the internal resistance. However, when the Schottky diode is used as the auxiliary rectifier element, the power loss can be reduced because the Schottky diode has a low internal resistance value in the forward direction. Further, the first auxiliary rectifier element Df1 and the second auxiliary rectifier element Df2 are provided in order to share currents with the first rectifier element D5 and the second rectifier element D6, respectively, to assist those rectifier element elements. Accordingly, elements having low withstanding voltages can be used, and thus low-cost elements can be used.

Further, the Schottky diode can perform high-speed switching, and is thus suitable as an auxiliary rectifier element for repeating current conduction and interruption operations.

[Other Embodiment of Switcher]

Next, another embodiment in connection of the first semiconductor switching element and the second semiconductor switching element of the switcher is described with reference to FIG. 11A and FIG. 11B.

Figure 11:
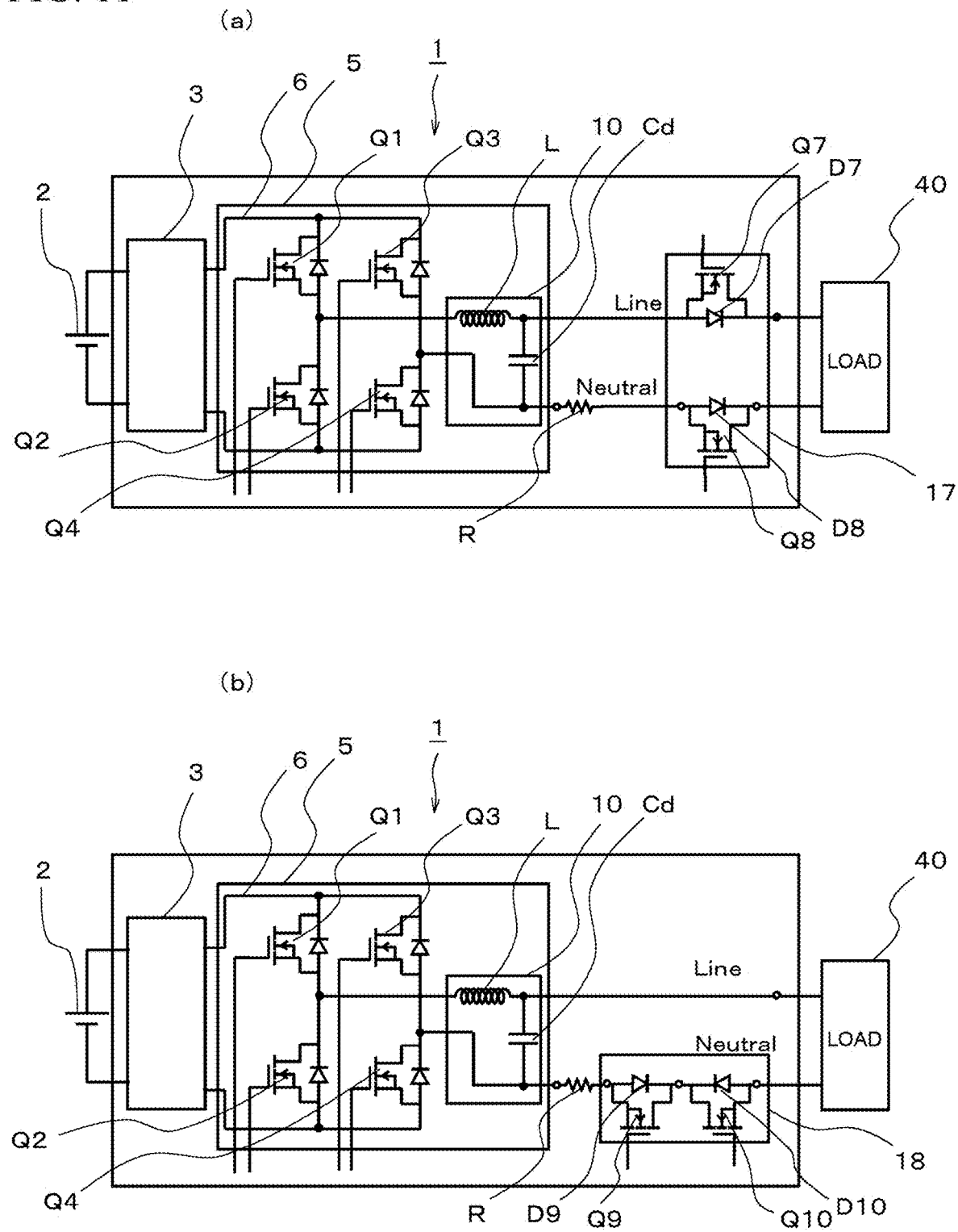
Figure 12:
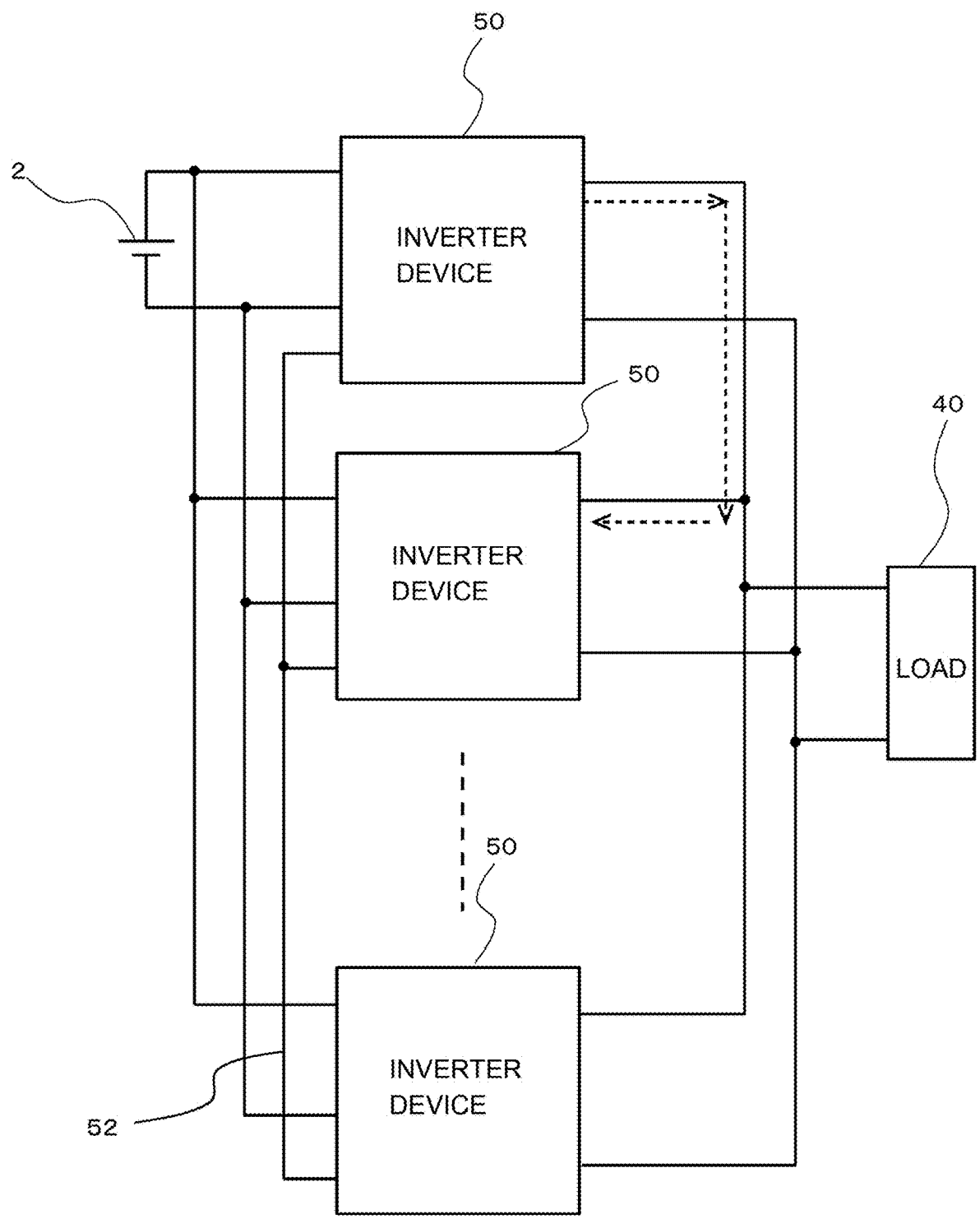
FIG. 12 is a diagram for illustrating an example of a configuration of related-art inverter devices for performing a parallel operation by connecting the inverter devices to each other by a control line.

FIG. 11A and FIG. 11B are diagrams for illustrating the another embodiment in the connection of the first semiconductor switching element and the second semiconductor switching element of the switcher. FIG. 11A is a diagram in which a third semiconductor switching element corresponding to one semiconductor switching element in a switch circuit is provided on the Line side, and a fourth semiconductor switching element corresponding to another semiconductor switching element therein is provided on the Neutral side. FIG. 11B is a diagram in which the connection is established so that a drain terminal of each of a fifth semiconductor switching element formed of a MOSFET and a sixth semiconductor switching element formed of a MOSFET, which are connected in series to each other in a switch circuit, is positioned on a node side.

A connection position on the output line of the first semiconductor switching element Q5 and the second semiconductor switching element Q6 of the switcher 15 is not limited to a series arrangement on one line between the filter circuit 10 and the load illustrated in FIG. 2. For example, as illustrated in FIG. 11A, a third semiconductor switching element Q7 formed of one MOSFET in a switch circuit 17 may be provided on the Line side, and a fourth semiconductor switching element Q8 formed of another MOSFET therein may be provided on the Neutral side.

The third semiconductor switching element Q7 formed of the MOSFET and the fourth semiconductor switching element Q8 formed of the MOSFET include a third rectifier element D7 and a fourth rectifier element D8 connected in parallel thereto, respectively.

Further, as illustrated in FIG. 11B, the connection may be established so that a drain terminal of each of a fifth semiconductor switching element Q9 including a fifth rectifier element D9 and being formed of a MOSFET and a sixth semiconductor switching element Q10 including a sixth rectifier element D10 and being formed of a MOSFET, which are connected in series to each other in a switch circuit 18, is positioned on the node side.

The switcher 15 illustrated in FIG. 2 represents a state in which the connection is established so that a source terminal of each of the first semiconductor switching element Q5 and the second semiconductor switching element Q6 which are connected in series to each other is positioned on the node side.

As described above, according to the parallel inverter device of the at least one embodiment of the present invention, the ON/OFF of the switcher is controlled based on the polarity of the AC voltage output from the filter circuit and the direction of the current flowing to the load on the output line. In this manner, a current flowing in the opposite direction is interrupted by one MOSFET in the OFF state and a diode connected to the one MOSFET, thereby being capable of preventing the cross current.

Further, according to the parallel inverter device of the at least one embodiment of the present invention, a voltage difference of the voltage generated in the first semiconductor switching element formed of a MOSFET or the voltage generated in the second semiconductor switching element formed of a MOSFET is detected, and the phase difference or the voltage difference between the load voltage and the AC voltage of the parallel inverter device can be adjusted so as to be reduced. Accordingly, the parallel inverter device itself can perform control into an optimum state in accordance with the state of the load voltage, without causing a cross current.

Further, a control line for communicating to/from another parallel inverter device is not required. Thus, there is no limitation on the number of parallel inverter devices connectable in the parallel operation. Accordingly, a large number of parallel inverter devices can be connected, thereby being capable of easily increasing the capacity.

Further, the parallel operation is performed while adjusting the phase difference or the voltage difference between the load voltage supplied from another parallel inverter device and the AC voltage output from the own parallel inverter device, and hence, not only the parallel operation of parallel inverter devices of the same type, but also the parallel operation with a commercial power source or a power generator having a different power generation mode is enabled to be performed.

The present invention can be embodied in a large number of forms without departing from the essential characteristics thereof. Thus, the above-mentioned embodiments are exclusive for description, and it is to be understood that the present invention is not limited to the above-mentioned embodiments.

REFERENCE SIGNS LIST 1 parallel inverter device
2 DC power supply
3 DC/DC converter
5 DC/AC inverter unit
6 inverter circuit
10 filter circuit
15, 16, 17, 18 switcher
25 controller
26 computer (microcomputer)
27 voltage detection circuit
28 switcher drive circuit
29 PWM control circuit
40 load
41 inductive load
50 inverter device (related art)
52 control line
Q1, Q2, Q3, Q4 switching element
D1, D2, D3, D4 diode
Q5 first semiconductor switching element
D5 first rectifier element (first diode)
Q6 second semiconductor switching element
D6 second rectifier element (second diode)
R shunt resistor
L inductor
Cd capacitor
Df1 first auxiliary rectifier element (Schottky diode)
Df2 second auxiliary rectifier element (Schottky diode)
a, b, c, d, e terminal for measurement

The invention claimed is:

1. A parallel inverter device applicable to a parallel operation, the parallel inverter device comprising:
an inverter circuit which includes a switching element, and is configured to perform, based on a PWM output signal generated by a PWM control circuit, switching of output of a DC power supply by switching the switching element to output a pulsed voltage;
a filter circuit configured to convert the pulsed voltage output from the inverter circuit into an AC voltage having a sine wave pattern to output the AC voltage;
a switcher including a first semiconductor switching element and a second semiconductor switching element which are connected on an output line for causing a current to flow from an output of the filter circuit to a load so that an energization direction of the first semiconductor switching element and an energization direction of the second semiconductor switching element are opposite directions, and are connected in series to the load on the output line; and
a controller configured to control ON/OFF of each of the first semiconductor switching element and the second semiconductor switching element included in the switcher based on a polarity of the AC voltage output from the filter circuit and a direction of a current flowing to the load on the output line,
wherein the first semiconductor switching element included in the switcher includes a first rectifier element which is connected in parallel to the first semiconductor switching element, and is configured to cause a current to flow in a direction opposite to the energization direction of the first semiconductor switching element, and
wherein the second semiconductor switching element included in the switcher includes a second rectifier element which is connected in parallel to the second semiconductor switching element, and is configured to cause a current to flow in a direction opposite to the energization direction of the second semiconductor switching element.

2. The parallel inverter device according to claim 1, wherein the first semiconductor switching element and the first rectifier element connected in parallel to the first semiconductor switching element are a MOSFET incorporating a floating diode, and the second semiconductor switching element and the second rectifier element connected in parallel to the second semiconductor switching element are a MOSFET incorporating a floating diode.

3. The parallel inverter device according to claim 2, wherein, instead of using the MOSFET, the first semiconductor switching element and the second semiconductor switching element are each an insulated gate bipolar transistor (IGBT), and the first rectifier element and the second rectifier element connected in parallel to the first semiconductor switching element and the second semiconductor switching element, respectively, are each a diode.

4. The parallel inverter device according to claim 1, wherein the controller is configured to perform control so that, based on the polarity of the AC voltage output from the filter circuit and the direction of the current flowing to the load on the output line, any one of the first semiconductor switching element and the second semiconductor switching element including the first rectifier element and the second rectifier element, respectively, for interrupting a flow of the current of the output line is set to ON and another one thereof is set to OFF.

5. The parallel inverter device according to claim 1,
wherein the PWM control circuit for generating the PWM output signal is configured to generate the pulsed PWM output signal for driving the switching element of the inverter circuit from a reference sine wave being a signal serving as a reference of a frequency of the AC voltage to be output from the filter circuit, and
wherein the PWM control circuit is configured to vary, in response to a signal from the controller, a shift amount of a phase of the reference sine wave and/or a magnitude of an amplitude of the reference sine wave, to thereby change at least one of a duty ratio or timing of output of the PWM output signal.

6. The parallel inverter device according to claim 5, wherein the controller is configured to control the shift amount of the phase of the reference sine wave of the PWM control circuit in accordance with the magnitude of the detected voltage, immediately after the polarity of the AC voltage output from the filter circuit is changed, so as to adjust a phase of the frequency of the AC voltage output from the filter circuit, to thereby reduce the phase difference between the load voltage and the AC voltage output from the filter circuit.

7. The parallel inverter device according to claim 5, wherein the controller is configured to control the magnitude of the amplitude of the reference sine wave of the PWM control circuit in accordance with the magnitude of the detected voltage, at the peak of the AC voltage output from the filter circuit, so as to adjust a magnitude of the AC voltage output from the filter circuit, to thereby reduce the voltage difference between the load voltage and the AC voltage output from the filter circuit.

8. The parallel inverter device according to claim 1, wherein the controller is configured to detect, immediately after the polarity of the AC voltage output from the filter circuit is changed, a voltage generated at a terminal into which an energization current flows in one of the first semiconductor switching element and the second semiconductor switching element which is set to OFF, and to detect, based on a magnitude of the detected voltage, a phase difference between a load voltage and the AC voltage output from the filter circuit.

9. The parallel inverter device according to claim 8, wherein the controller is configured to control the shift amount of the phase of the reference sine wave of the PWM control circuit in accordance with the magnitude of the detected voltage, immediately after the polarity of the AC voltage output from the filter circuit is changed, so as to adjust a phase of the frequency of the AC voltage output from the filter circuit, to thereby reduce the phase difference between the load voltage and the AC voltage output from the filter circuit.

10. The parallel inverter device according to claim 1, wherein the controller is configured to detect, at a peak of the AC voltage output from the filter circuit, a voltage generated at a terminal into which an energization current flows in one of the first semiconductor switching element and the second semiconductor switching element which is set to OFF, and to detect, based on a magnitude of the detected voltage, a voltage difference between a load voltage and the AC voltage output from the filter circuit.

11. The parallel inverter device according to claim 10, wherein the controller is configured to control the magnitude of the amplitude of the reference sine wave of the PWM control circuit in accordance with the magnitude of the detected voltage, at the peak of the AC voltage output from the filter circuit, so as to adjust a magnitude of the AC voltage output from the filter circuit, to thereby reduce the voltage difference between the load voltage and the AC voltage output from the filter circuit.

12. The parallel inverter device according to claim 1, wherein the controller is configured to detect, immediately after the polarity of the AC voltage output from the filter circuit is changed, whether a current flows through the output line, and to set, when the current flows, both of the first semiconductor switching element and the second semiconductor switching element included in the switcher to ON.

13. The parallel inverter device according to claim 1, wherein the switcher includes:
the first semiconductor switching element;
the first rectifier element connected in parallel to the first semiconductor switching element;
a first auxiliary rectifier element which has a forward voltage (Vf) lower than a forward voltage (Vf) of the first rectifier element, and is connected in parallel to the first rectifier element so as to have the same polarity as a forward-direction polarity of the first rectifier element;
the second semiconductor switching element;
the second rectifier element connected in parallel to the second semiconductor switching element; and
a second auxiliary rectifier element which has a forward voltage (Vf) lower than a forward voltage (Vf) of the second rectifier element, and is connected in parallel to the second rectifier element so as to have the same polarity as a forward-direction polarity of the second rectifier element.

14. The parallel inverter device according to claim 13, wherein the first auxiliary rectifier element and the second auxiliary rectifier element are each a Schottky diode.

* * * * *